US009379946B2

(12) United States Patent
Panasyuk et al.

(10) Patent No.: US 9,379,946 B2
(45) Date of Patent: Jun. 28, 2016

(54) MODEL-BASED VIRTUAL NETWORKING

(75) Inventors: Anatoliy Panasyuk, Bellevue, WA (US);
Dharshan Rangegowda, Seattle, WA (US); Ram Viswanathan, Kirkland, WA (US); Anthony S. Chavez, Kenmore, WA (US); Jiazhen Chen, Bellevue, WA (US); Morgan Brown, Bellevue, WA (US); Hasan S. Alkhatib, Kirkland, WA (US); Geoffrey H. Outhred, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 578 days.

(21) Appl. No.: 12/616,800

(22) Filed: Nov. 12, 2009

(65) Prior Publication Data

US 2011/0110268 A1    May 12, 2011

(51) Int. Cl.
  *H04L 12/24* (2006.01)
  *H04L 29/06* (2006.01)
(52) U.S. Cl.
  CPC .............. *H04L 41/145* (2013.01); *H04L 41/12* (2013.01); *H04L 63/102* (2013.01); *H04L 63/20* (2013.01)
(58) Field of Classification Search
  CPC ............ H04L 12/2602; H04L 41/0604; H04L 41/0609; H04L 41/0659; H04L 41/0677; H04L 41/0681; H04L 41/069; H04L 41/0695; H04L 41/22; H04L 43/00; H04L 43/0811; H04L 43/0817; G06F 11/2257; G06F 11/3041; G06F 11/3048; G06F 11/3055; G06F 11/3006
  See application file for complete search history.

(56) References Cited

U.S. PATENT DOCUMENTS 5,751,967 A    5/1998  Raab et al.
6,374,293 B1 *  4/2002  Dev et al. .................. 709/220
(Continued)

FOREIGN PATENT DOCUMENTS

| CN | 1287738 A | 3/2001 |
| EP | 1713232 A1 | 10/2006 |
| JP | 2003188906 A | 7/2003 |
| WO | WO2006045844 | * 5/2006 |

OTHER PUBLICATIONS

Ganguly, et al., "Improving Peer Connectivity in Wide-Area Overlays of Virtual Workstations", Retrieved at <<http://delivery.acm.org/10.1145/1390000/1383439/p129-ganguly.pdf?key1=1383439&key2=8066374521&coll=GUIDE&dl=GUIDE&CFID=56155931& CFTOKEN=58809431>>, HPDC'08, Jun. 23-27, 2008.

(Continued)

*Primary Examiner* — Jae Y Lee
*Assistant Examiner* — Aixa Guadalupe-Cruz
(74) *Attorney, Agent, or Firm* — Ben Tabor; Doug Barker; Micky Minhas

(57) ABSTRACT

Architecture that facilitates the virtual specification of a connection between physical endpoints. A network can be defined as an abstract connectivity model expressed in terms of the connectivity intent, rather than any specific technology. The connectivity model is translated into configuration settings, policies, firewall rules, etc., to implement the connectivity intent based on available physical networks and devices capabilities. The connectivity model defines the connectivity semantics of the network and controls the communication between the physical nodes in the physical network. The resultant virtual network may be a virtual overlay that is independent of the physical layer. Alternatively, the virtual overlay can also include elements and abstracts of the physical network(s). Moreover, automatic network security rules (e.g., Internet Protocol security-IPSec) can be derived from the connectivity model of the network.

20 Claims, 8 Drawing Sheets

(56) References Cited

U.S. PATENT DOCUMENTS

| | | | |
|---|---|---|---|
| 6,728,267 | B1 | 4/2004 | Giese et al. |
| 7,277,931 | B1 | 10/2007 | Booth et al. |
| 7,339,937 | B2 | 3/2008 | Mitra et al. |
| 2002/0007468 | A1* | 1/2002 | Kampe et al. ............ 714/4 |
| 2007/0028002 | A1 | 2/2007 | McCanne |
| 2008/0155537 | A1 | 6/2008 | Dinda et al. |
| 2008/0183853 | A1 | 7/2008 | Manion et al. |
| 2008/0259790 | A1 | 10/2008 | Joseph et al. |
| 2009/0241108 | A1 | 9/2009 | Edwards et al. |

OTHER PUBLICATIONS

Chen, et al., "A Forwarding Model for Voronoi-based Overlay Network", Retrieved at <<http://ieeexplore.ieee.org/stamp/stamp.jsp?arnumber=4447818&isnumber=4447779>>, IEEE, Dec. 5-7, 2007.

Davy, et al., "Towards a Policy-based Autonomic Virtual Network to support Differentiated Security Services", Retrieved at <<http://www.tssg.org/people/sdavy/2008_TEMU_SDavy_et_al_final.pdf>>, 2008.

Crespo, et al., "Semantic Overlay Networks", Retrieved at <<http://www.mpi-inf.mpg.de/departments/d5/teaching/ws03_04/p2p-data/12-09-writeup2.pdf>>, Dec. 2003.

"International Search Report", Mailed Date: Jul. 12, 2011, Application No. PCT/US2010/054571, Filed Date: Oct. 28, 2010, pp. 10.

"First Office Action and Search Report Issued in Chinese Patent Application No. 201080051242.3", Mailed Date: Apr. 1, 2014, 12 Pages.

"Supplementary Search Report Issued in European Patent Application No. 10830473.4", Mailed Date: Oct. 23, 2014, 5 Pages.

"Office Action Received for Japanese Patent Application No. 2012-538845", Mailed Date: Nov. 25, 2014, 4 Pages.

* cited by examiner

MODEL-BASED VIRTUAL NETWORKING

BACKGROUND

Network administration is no longer a simple task. Large companies typically have a large presence in a single location or dispersed across several geographic locations which are interconnected via a corporate enterprise. With such large and complex deployments, the frequently changing dynamics associated with the networks involves adding/deleting employees, adding/deleting employee devices (e.g., computers, printers.), etc., and is particularly evident when dealing with complex networks that span multiple locations, or include multiple subnets, VPNs (virtual private networks), multiple routers or other network devices, such as servers, routers, gateways, switches, and so on. Moreover, today's network management oftentimes includes a vendor-specific knowledge and data further complicating network management and administration.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the virtual specification of a connection between endpoints. A network can be defined as an abstract connectivity model expressed in terms of the connectivity intent, rather than any specific technology. The architecture compiles (translates) the connectivity model into configuration settings, policies, firewall rules, etc., to implement the connectivity intent based on available physical networks and devices capabilities.

The connectivity model is used to define the connectivity semantics of a network. The model can be translated into a set of policies and network configuration that control the communication between the physical nodes in the physical network. The resultant virtual network may be a virtual overlay that is independent of the physical layer. Alternatively, the virtual overlay can also include elements and abstracts of the physical network(s). Moreover, automatic network security rules (e.g., Internet Protocol security-IPSec) can be derived from the connectivity model of the network.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
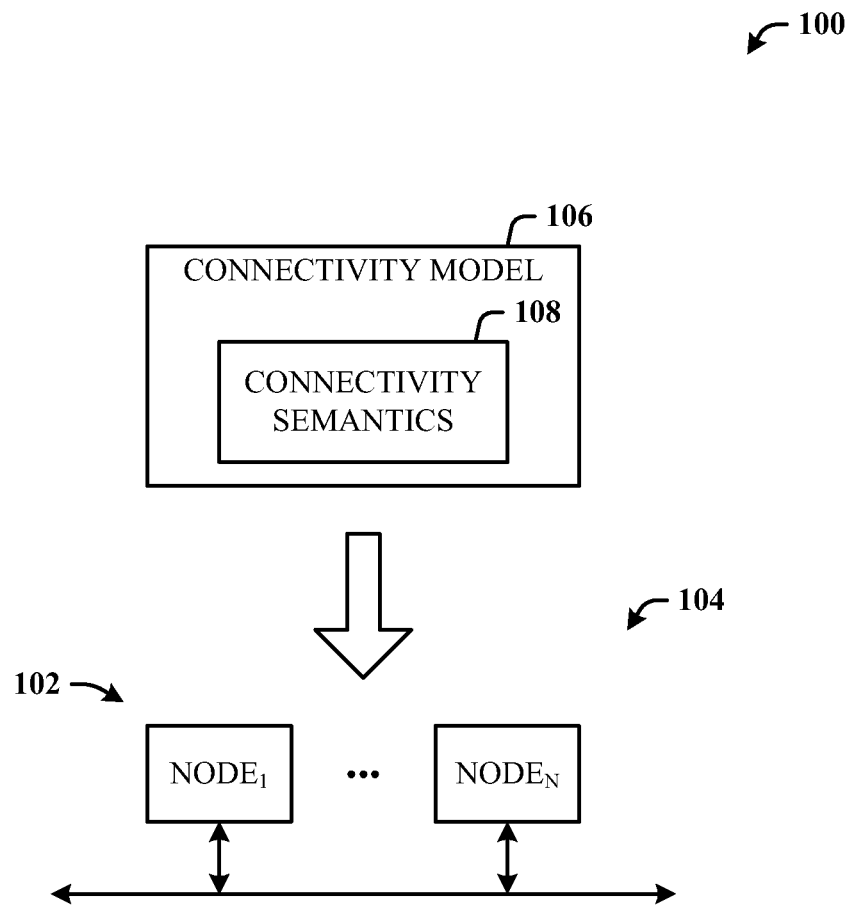
FIG. 1 illustrates a computer-implemented network management system in accordance with the disclosed architecture.

The disclosed architecture facilitates the development and implementation of a connectivity model that defines a virtual network to configure and manage a physical network. In other words, a physical network is defined as an abstract model, expressed in terms of the connectivity intent, rather than any specific technology. For example, the connectivity model can specify virtually that computers X, Y and Z should freely communicate with each other and should also have controlled communication on particular ports with computer D. Translation (compiling) of the model applies the virtual network to the physical network such that configuration settings, policies, firewall rules, etc., implement the connectivity intent given available physical networks and physical devices capabilities.

For example, IP addresses in a specific range can be assigned to physical machines A and B. Rather than specifically calling out the routing between appropriate subnets, as represented in the existing techniques for configuring the physical network, the connectivity semantics of connectivity model simply define that machines A and B should be able to communicate with each other.

The connectivity model operates in terms of identities (e.g., machines and users), groups (e.g., machines and users) and other abstractions (logical model without the details of connectivity), rather than physical network addresses.

Implementation of the desired connectivity can be accomplished by creating one or more network overlays that are independent of the physical network(s), and/or by controlling physical networks via appropriate API (application programming interface)/settings. In configurations that use network overlays, the connectivity model also can be used to control IP address assignment to machines and/or users in the network overlay. For example, it is possible to allocate a specific IP address to a machine and that address will then be valid regardless of the physical network or IP address of the machine, since the assigned IP address is in the network overlay space. This capability facilitates supporting legacy applications.

The architecture includes a mechanism for defining the connectivity model of a network or networks as a set of rules expressing connectivity intent. The mechanism can be a GUI (graphical user interface) editor, for example, for graphically editing the connectivity model. A mechanism is also included for compiling the connectivity model into configuration settings, policies, firewall rules, etc., to implement the desired connectivity model.

The connectivity model translator (compiler) can be specific to a set of networking technologies utilized by a particular implementation. For example, one possible implementation can be via Windows™ Direct Access™ (DA) by Microsoft Corporation, where the connectivity model can be compiled into a series of IPSec, Teredo (an transmission protocol for sending IPv6 datagrams through NAT(network address translation) devices), SSTP (secure socket tunneling protocol), firewall and other settings used in an implementation.

It is possible to create translators for other overlay network technology sets, such as IPv4 and IPv6, for example. Translators (compilers) can also be created for applying the connectivity model to the physical networks by controlling programmable switches and VLANs (virtual local area networks), for example.

The disclosed architecture also makes possible the implementation of hybrid systems, where parts of the connectivity model are supported by the network overlay(s) while other parts of the model are supported by the physical networks. An example of such arrangement is a blend of machines connected to a LAN which can be controlled programmatically (e.g., via VLANs, IPSec, etc.), and machines connected remotely (e.g., via Teredo or SSTP), all of which are controlled by the single connectivity model.

The architecture also provides the mechanism for executing necessary elements of the connectivity model. This necessity administration depends on the physical implementation (e.g., overlay network versus physical network, Teredo versus SSTP versus L2TP (Layer 2 tunneling protocol) versus other protocols).

The architecture significantly simplifies network creation, management and use by focusing on the desired connectivity (connectivity intent) rather than implementation details (e.g., IP ranges, IPSec, policies, etc.). Moreover, IT personnel no longer need to have deep networking knowledge to create or manage the network. In simple cases, such as small or medium business, and consumer applications, the complexity can be completely eliminated, allowing administrators with no networking knowledge to successfully setup and manage the network.

Additionally, simplification is provided by making the network consistent and coherent and by deriving all relevant settings, policies, etc., from the single connectivity model. All required settings/policies are guaranteed to be well aligned and non-conflicting. This is different from existing situations when each type of setting/policy/rule is defined independently, leaving room for error and inconsistencies.

The simplification also provides high reliability by ensuring consistency and coherency, and by including built-in self-test mechanisms that verify that actual settings and connectivity are aligned with the intended connectivity model.

Self-adjusting capabilities of the architecture allow the network to automatically switch to alternative connectivity technologies and systems (e.g., SSTP versus direct IPv6 or Teredo) to preserve the desired connectivity model while underlying network systems are changing (e.g., a portable computer moving between different networks).

Additionally, high security can be achieved by automatically deriving network security rules (e.g., IPSec) from the connectivity model. This allows secure connectivity without spending any time to configure or manage network security.

The disclosed connectivity model also allows for the creation of more complex networks and systems that use a combination of technologies with hosted systems.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented network management system 100 in accordance with the disclosed architecture. The system 100 includes an arrangement of nodes 102 of a physical network 104, and a connectivity model 106 that defines virtual connectivity between the nodes 102 using connectivity semantics 108. The connectivity model 106 is created to manage communications between the nodes 102 of the physical network 104.

The connectivity model 106 describes a virtual network that overlays a physical layer and is independent of the physical layer. The connectivity model 106 describes a virtual network that overlays a physical layer and includes elements and abstracts of the physical network 104. The connectivity model 106 can also define network security as part of the connectivity semantics 108. The connectivity semantics 108 can include machine identities and user identities of the nodes, groups of nodes and groups of users and/or node identities. The connectivity semantics 108 manage ports and gateways of the physical network 108.

Thus, network administration involved with a portable computer moving from one network to another network (e.g., across corporate geographic locations) is handled seamlessly since the connectivity model indicates the groups to which the user should be connected even when mobile.

Figure 2:
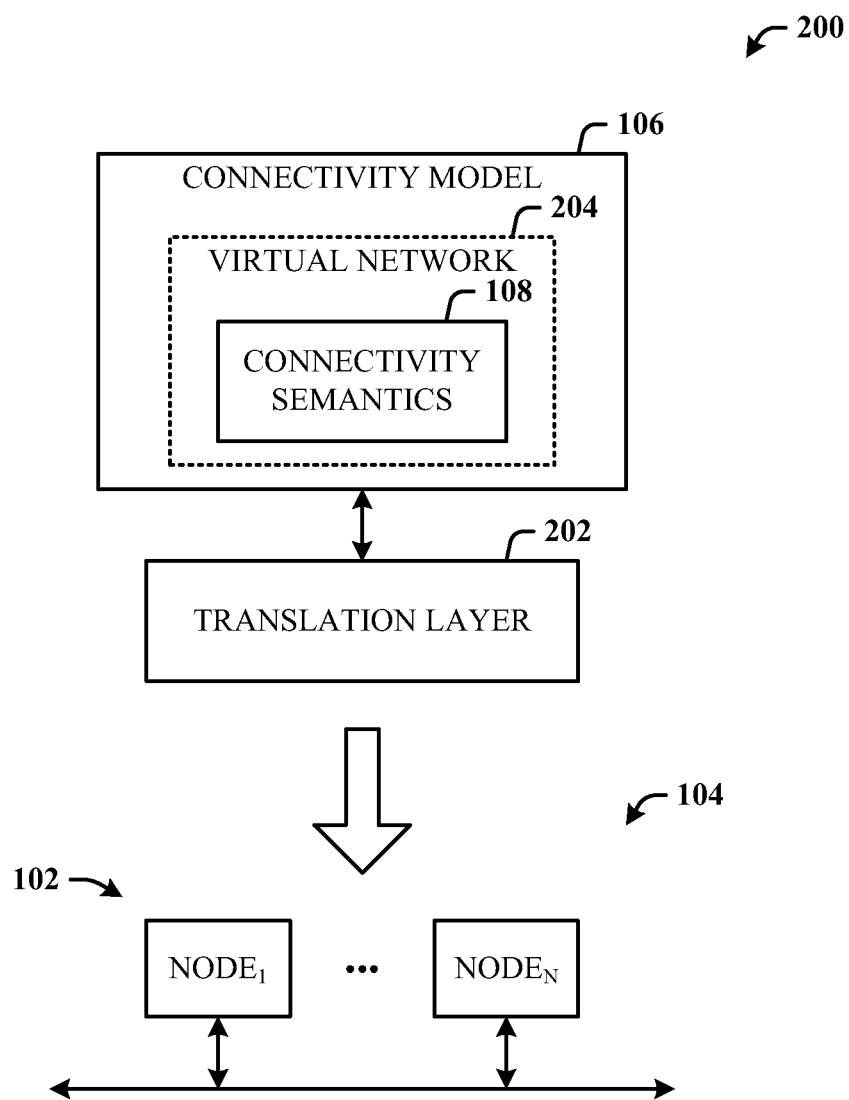
FIG. 2 illustrates an alternative embodiment of a network management system that includes a translation layer.

FIG. 2 illustrates an alternative embodiment of a network management system 200 that includes a translation layer 202. The system 200 includes the arrangement of nodes 102 of the physical network 104 (physical layer), and the connectivity model 106 that defines virtual connectivity between the nodes 102 using connectivity semantics 108. The connectivity model 106 is created to manage communications between the nodes 102 of the physical network 104. The translation layer 202 translates the connectivity semantics 108 into policies and configuration information that manage the communications between the nodes 102 of the physical network 104.

Put another way, the system 200 includes the arrangement of nodes 102 of the physical network 104, the connectivity model 106 that defines virtual connectivity between the nodes 102 using the connectivity semantics 108, and the translation layer 202 that translates the connectivity semantics 108 into policies and configuration information that manage communications between the nodes 102 of the physical network 104.

The virtual connectivity describes a virtual network 204 that overlays a physical layer and is independent of the physical layer. The virtual connectivity describes a virtual network 204 that overlays a physical layer and includes elements and abstracts of the physical network 104. The connectivity model 106 defines network security as part of the connectivity semantics 108. The connectivity semantics 108 include machine identities and user identities of the nodes, groups of nodes and groups of users, and/or node identities.

Figure 3:
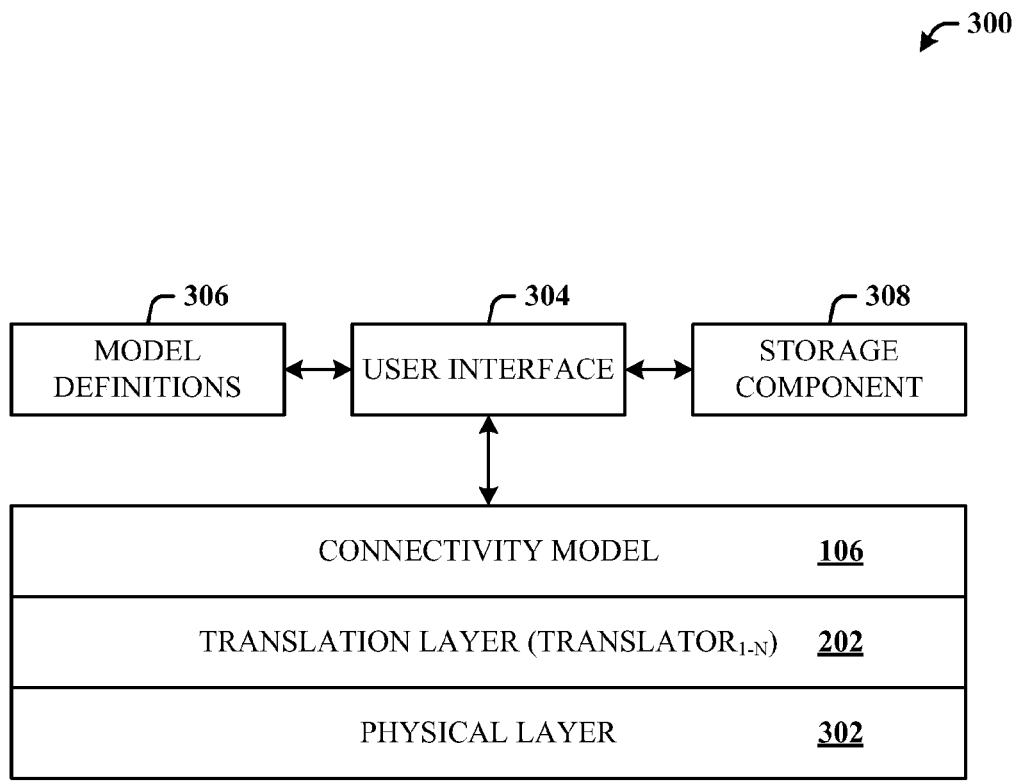
FIG. 3 illustrates a more detailed representation of a network management system in accordance with the disclosed architecture.

FIG. 3 illustrates a more detailed representation of a network management system 300 in accordance with the disclosed architecture. The system 300 includes the connectivity model 106 (and connectivity semantics of the virtual network), which can be applied to a physical layer 302 via the translation layer 202. The translation layer 202 can include one or multiple translators for translating the semantics into policies and rules, etc., for direct application to the physical layer 302.

The system 300 also includes a user interface 304 (e.g., graphical UI) for developing and configuring the connectivity model 106 using model definitions 306. The definitions 306 can include a wide variety of definitions for selective deployment in different connectivity models. The system 300 can also include a storage component 308 for the storage of existing models for automatic or dynamic retrieval and utilization as desired. Connectivity models can be developed online or offline, and stored for later retrieval and use, on demand.

Figure 4:
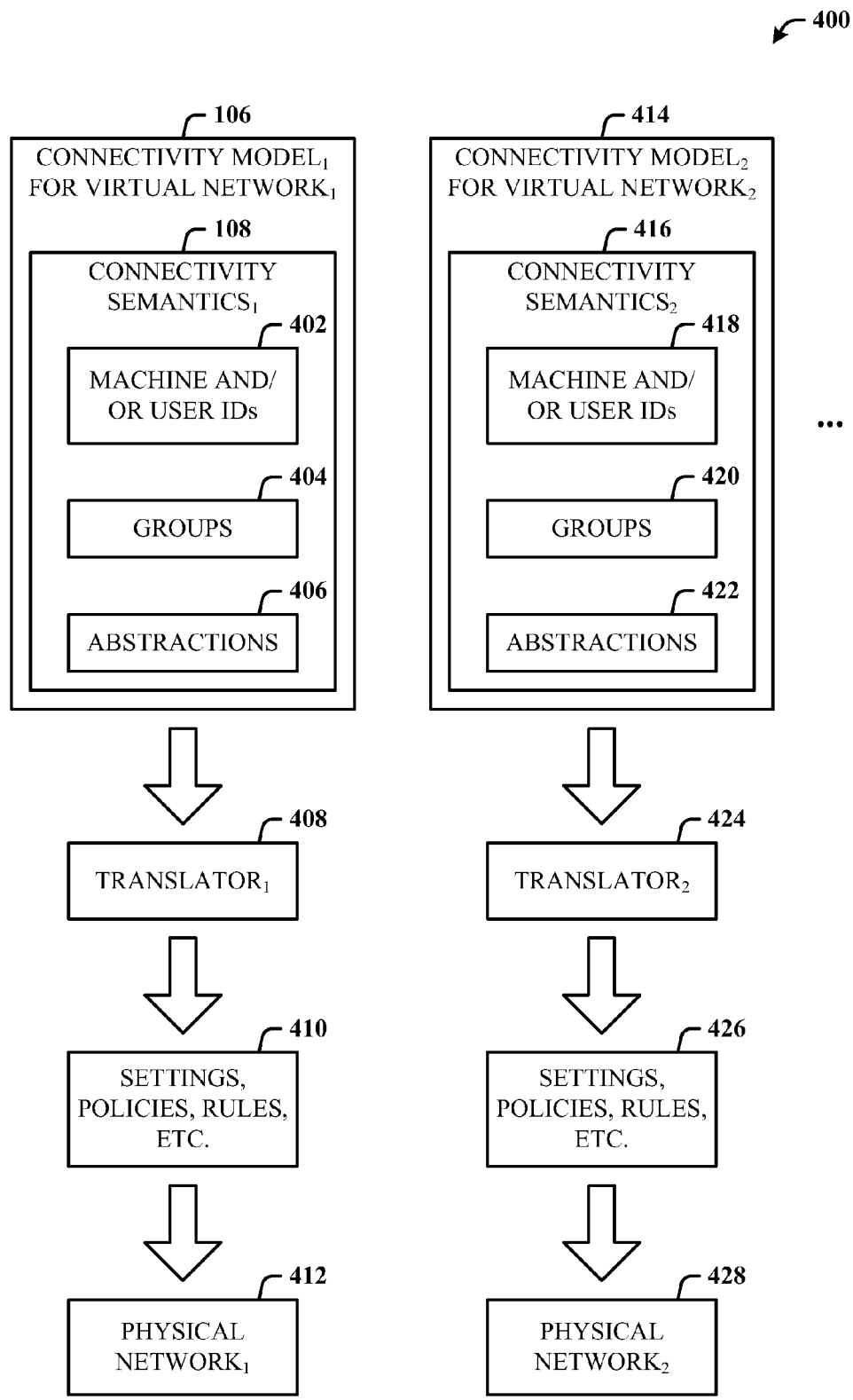
FIG. 4 illustrates exemplary details of connectivity models.

FIG. 4 illustrates exemplary details of connectivity models 400. Here, the connectivity model 106 includes the connectivity semantics 108 that can define machine and/or user IDs 402, groups 404 (of machines and/or users), and other abstractions 406. The semantics 108 are passed through a translator 408 specific to the connectivity model 108 (or semantic portions thereof) for translating the semantics 108 into settings, policies, and rules 410 that facilitate managing communications of a physical network 412.

Similarly, a second connectivity model 414 includes the connectivity semantics 416 that can define machine and/or user IDs 418, groups 420 (of machines and/or users), and other abstractions 422. The semantics 416 are passed through a translator 424 specific to the second connectivity model 414 (or semantic portions thereof) for translating the semantics 416 into settings, policies, and rules 426 that facilitate managing communications of a physical network 428.

In other words, multiple connectivity models can be employed to configure and management corresponding physical networks, subnets of a network, physical devices (e.g., gateways, routers, etc.), and ports, for example, of physical devices and nodes, restricted only by the semantics employed and translatable in the connectivity semantics. With respect to the multiple translators, one translator can be dedicated to handling IPsec policies, a second translator can be dedicated to handling firewall policies, a third translator is dedicated to handling SSL (secure socket layer) connections, a fourth translator can be dedicated to handling gateways, and so on.

The connectivity model disclosed herein provides a convenient and powerful mechanism for administrators of networks to define policies for system health requirements, such as assigning policies to groups of machines/users as facilitated by NAP (network access protection), a technology developed by Microsoft Corporation. The health requirements can be related to nodes having the desired version of malware detection and prevention software and an active firewall, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
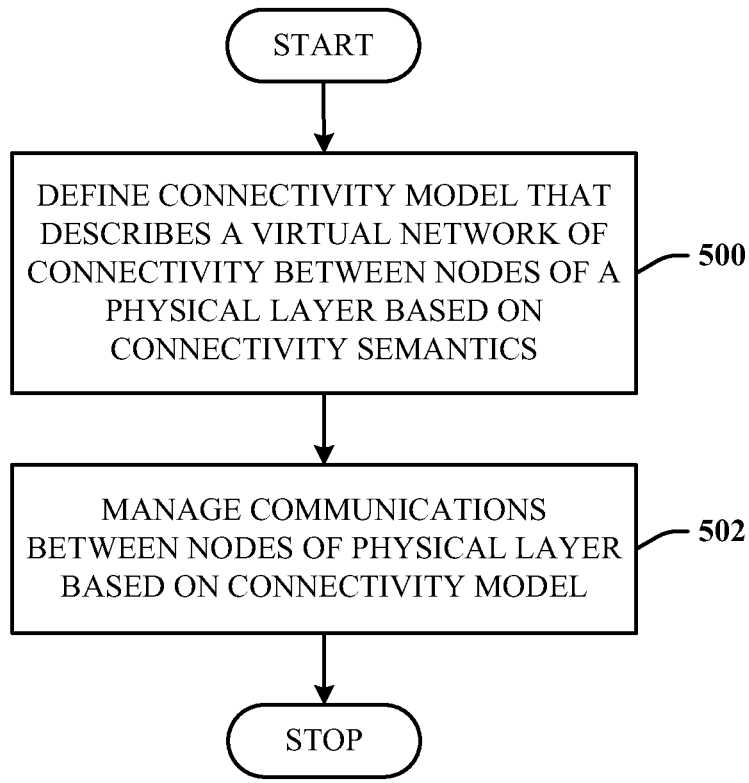
FIG. 5 illustrates a computer-implemented network management method.

FIG. 5 illustrates a computer-implemented network management method. At 500, a connectivity model is defined that describes a virtual network of connectivity between nodes of a physical layer based on connectivity semantics. At 502, communications is managed between the nodes of the physical layer based on the connectivity model.

Figure 6:
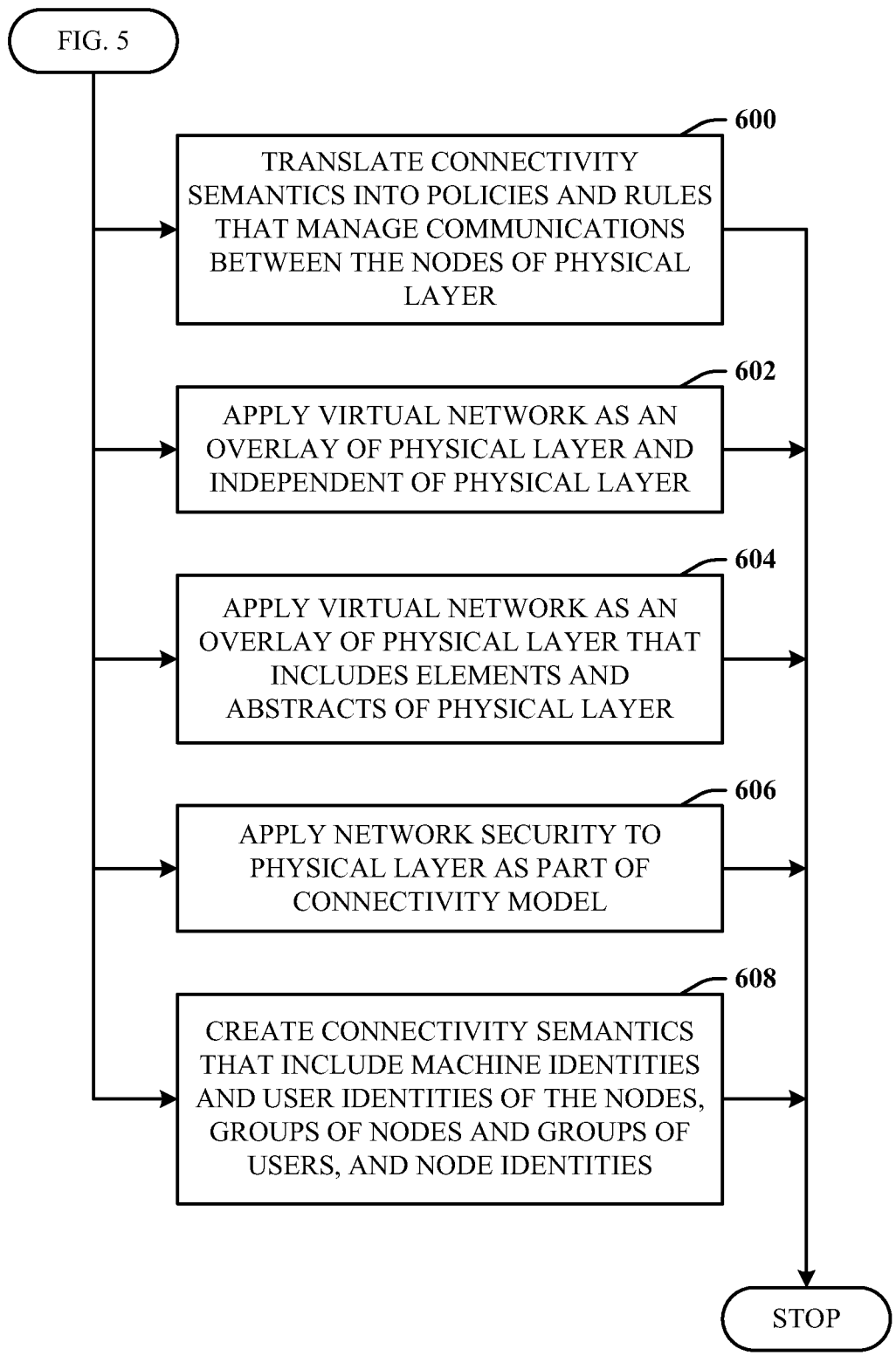
FIG. 6 illustrates additional aspects of the method FIG. 5.

FIG. 6 illustrates additional aspects of the method FIG. 5. At 600, the connectivity semantics are translated into policies and rules that manage the communications between the nodes of the physical layer. At 602, the virtual network is applied as an overlay of the physical layer and independent of the physical layer. At 604, the virtual network is applied as an overlay of the physical layer that includes elements and abstracts of the physical layer. At 606, network security is applied to the physical layer as part of the connectivity model. At 608, connectivity semantics are created that include machine identities and user identities of the nodes, groups of nodes and groups of users, and node identities.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
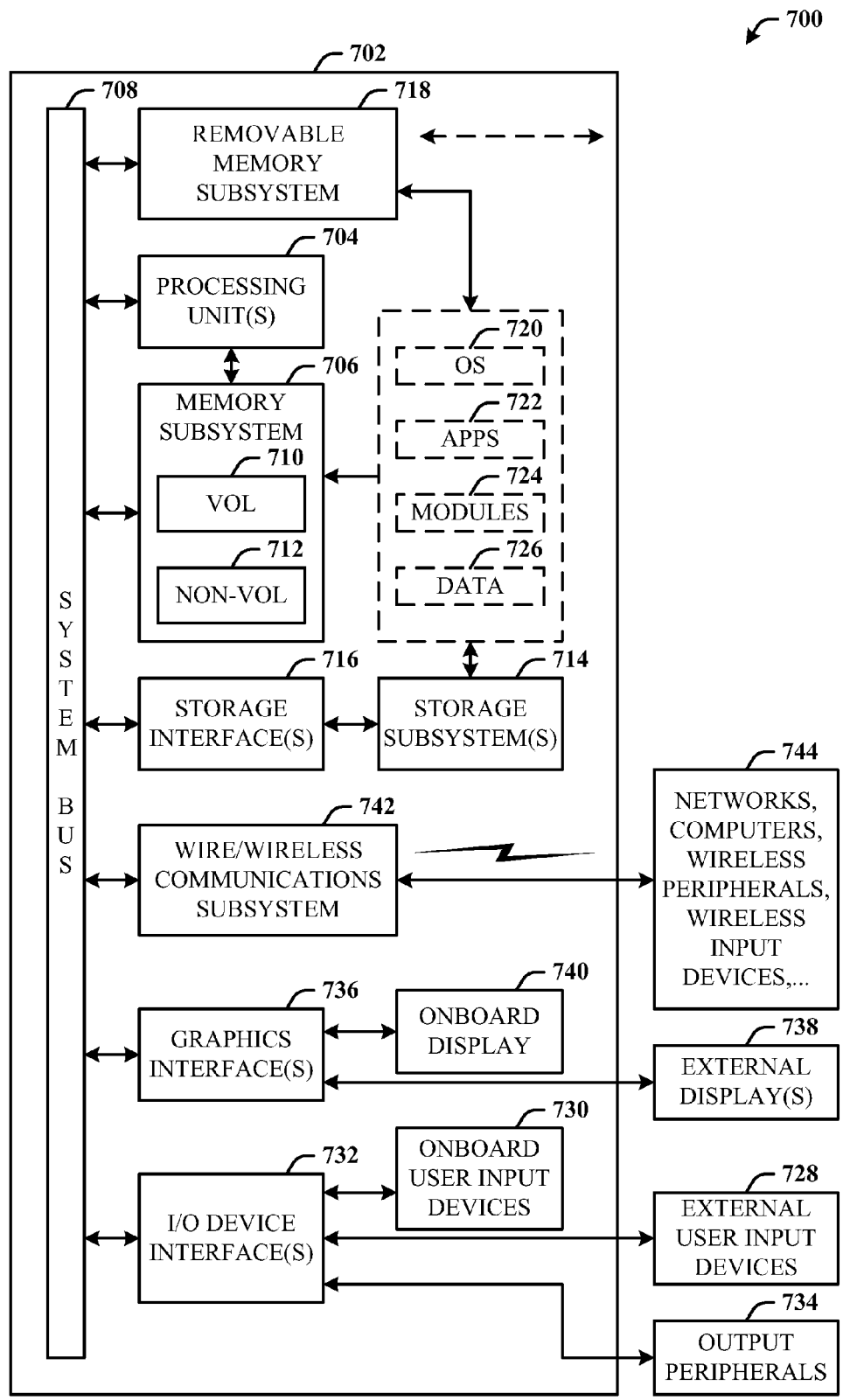
FIG. 7 illustrates a block diagram of a computing system operable to develop, translate, and implement a connectivity model in accordance with the disclosed architecture.

Referring now to FIG. 7, there is illustrated a block diagram of a computing system 700 operable to develop, translate, and implement a connectivity model in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the connectivity model and connectivity semantics described herein, the translation layer and translators, the system 300 of FIG. 3, models 400 and associated entities of FIG. 4, and the methods represented by the flow charts of FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 8:
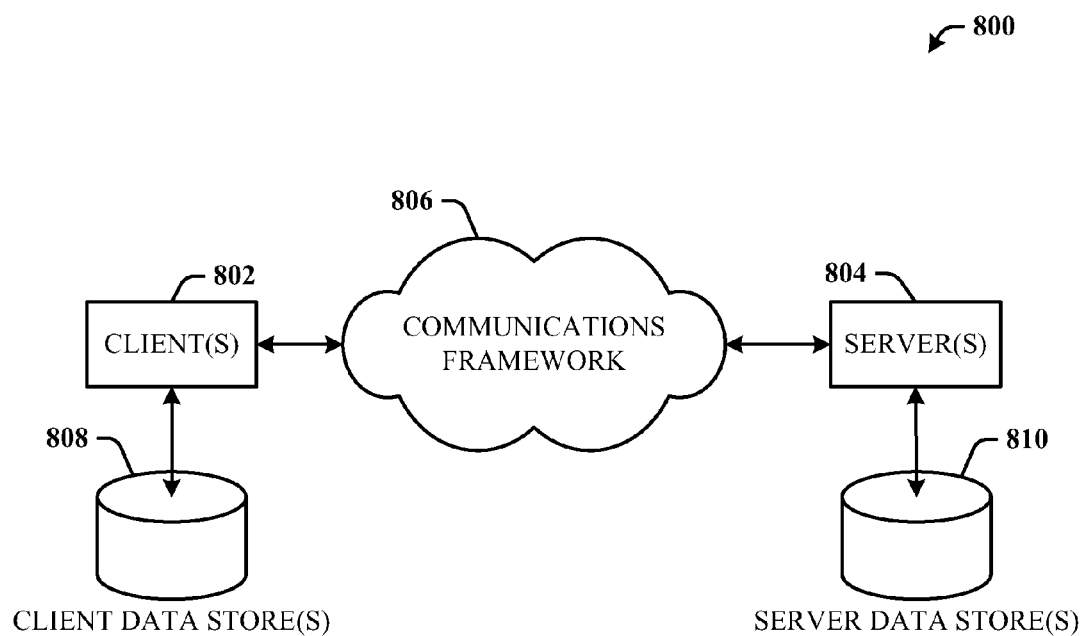
FIG. 8 illustrates a schematic block diagram of a computing environment that for development, translation, and implementation of a connectivity model.

Referring now to FIG. 8, there is illustrated a schematic block diagram of a computing environment 800 that for development, translation, and implementation of a connectivity model. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented network management system, comprising:
    a hardware processor and a memory, the hardware processor configured to execute instructions in the memory, that when executed, enable;
        an arrangement of nodes of a physical network comprising a physical layer;
        a connectivity model configured to define virtual connectivity between the nodes using connectivity semantics that define abstractions of machines and users of the network, and created to manage communications between the nodes of the physical network; and
        a translation layer comprising multiple translators, the translation layer between the connectivity model and the physical layer, the translation layer configured to translate the connectivity semantics into network policies and configuration settings for each node in the physical layer, which network policies and configuration settings enable management of the communications between the nodes using the translation layer.

2. The system of claim 1, wherein the multiple translators include a first translator dedicated to handling a set of security policies, a second translator dedicated to handling firewall policies, a third translator dedicated to handling SSL (secure socket layer) connections, and a fourth translator dedicated to handling gateways.

3. The system of claim 1, wherein the connectivity model describes a virtual network that overlays a physical layer and is independent of the physical layer.

4. The system of claim 1, wherein the connectivity model describes a virtual network that overlays a physical layer and includes elements and abstracts of the physical network.

5. The system of claim 1, wherein the connectivity model defines network security as part of the connectivity semantics.

6. The system of claim 1, wherein the connectivity semantics include machine identities and user identities of the nodes.

7. The system of claim 1, wherein the connectivity semantics include groups of nodes and groups of users.

8. The system of claim 1, wherein the connectivity semantics include node identities.

9. The system of claim 1, wherein the connectivity semantics manage ports and gateways of the physical network.

10. A computer-implemented network management system, comprising:
    a hardware processor and a memory, the hardware processor configured to execute instructions in the memory, that when executed, enable;
        an arrangement of nodes of a physical network;
        a connectivity model configured to define virtual connectivity between the nodes using connectivity semantics that define abstractions of attributes of the physical network; and
        a plurality of translators configured to translate the connectivity semantics into different policies or configuration settings for each of the nodes, to perform management of communications between the nodes of the physical network.

11. The system of claim 10, wherein the virtual connectivity describes a virtual network that overlays a physical layer and is independent of the physical layer.

12. The system of claim 10, wherein the virtual connectivity describes a virtual network that overlays a physical layer and includes elements and abstracts of the physical network.

13. The system of claim 10, wherein the connectivity model defines network security as part of the connectivity semantics.

14. The system of claim 10, wherein the connectivity semantics include machine identities and user identities of the nodes, groups of nodes and groups of users, and node identities.

15. A computer-implemented network management method performed by a computer system executing machine-readable instructions, the method comprising acts of:
    defining a connectivity model that describes a virtual network of connectivity between nodes of a physical layer based on connectivity semantics that define abstractions of properties of the virtual network;
    defining a translation layer comprising multiple translators configured to translate the connectivity semantics; and
    managing communications between the nodes of the physical layer based on the connectivity model.

16. The method of claim 15, further comprising translating the connectivity semantics into policies and rules that manage the communications between the nodes of the physical layer.

17. The method of claim 15, further comprising applying the virtual network as an overlay of the physical layer and independent of the physical layer.

18. The method of claim 15, further comprising applying the virtual network as an overlay of the physical layer that includes elements and abstracts of the physical layer.

19. The method of claim 15, further comprising applying network security to the physical layer as part of the connectivity model.

20. The method of claim 15, further comprising creating connectivity semantics that include machine identities and user identities of the nodes, groups of nodes and groups of users, and node identities.

* * * * *